United States Patent Office 3,129,171
Patented Apr. 14, 1964

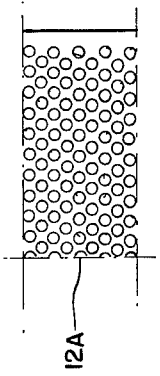
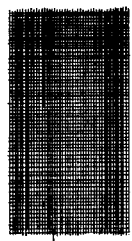
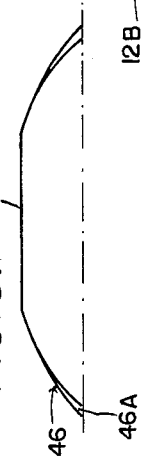
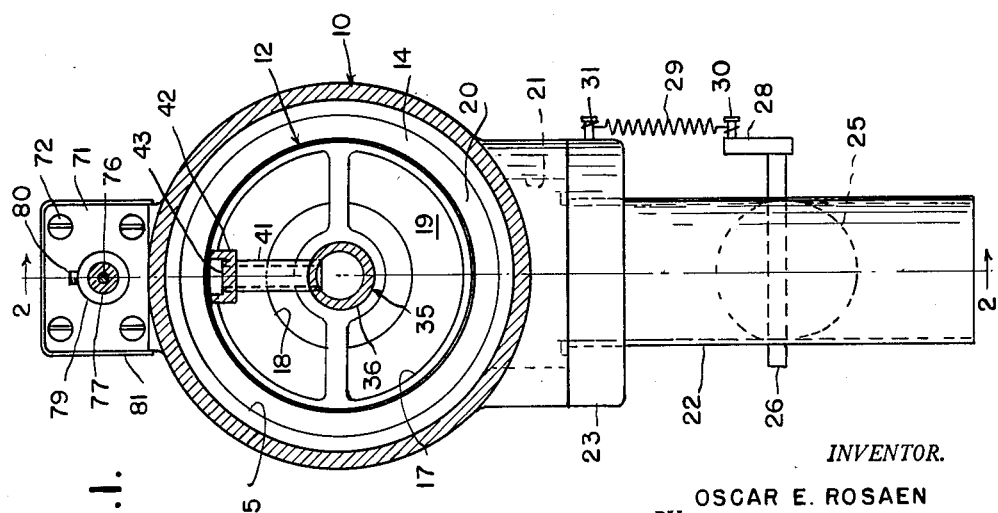

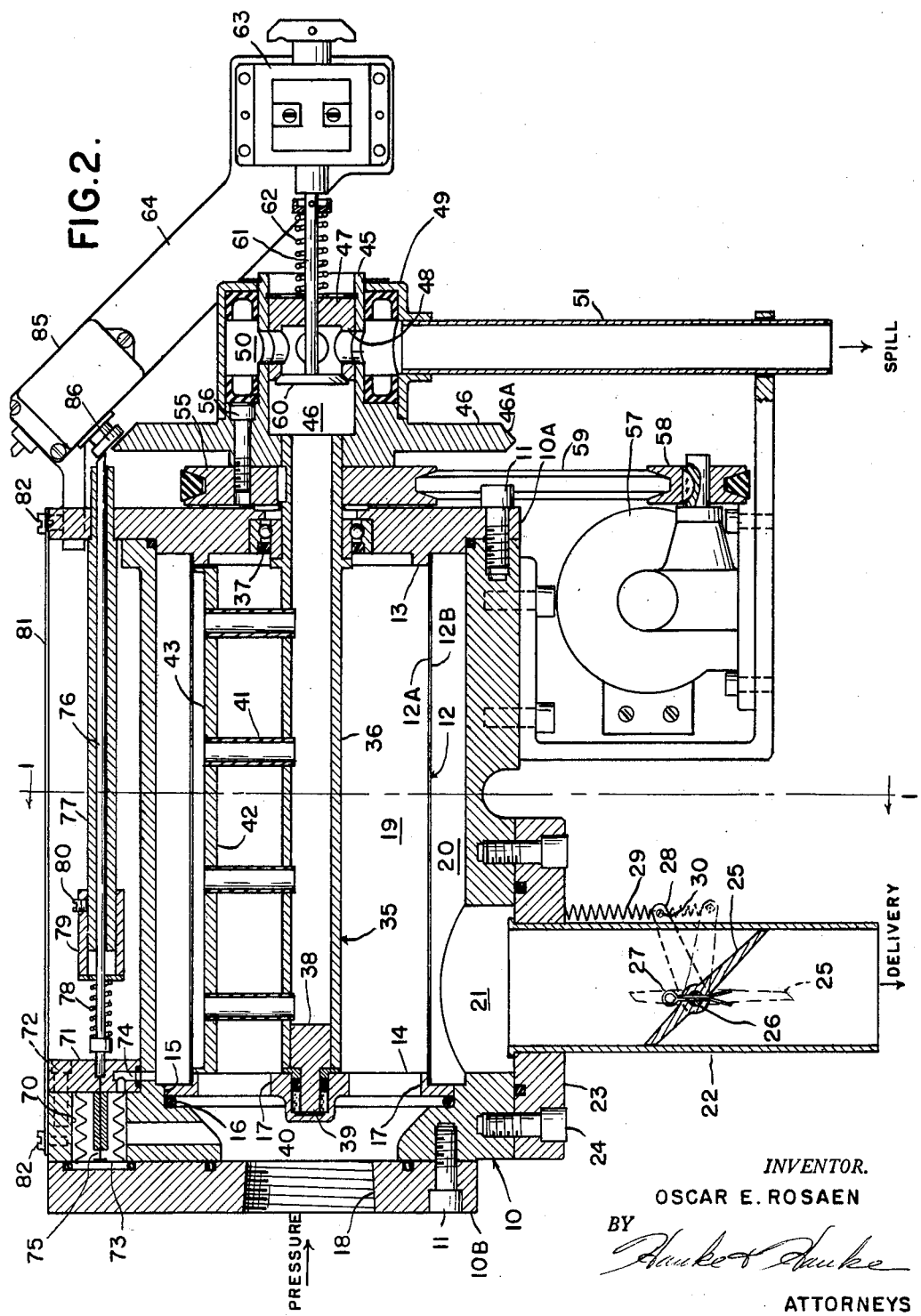

3,129,171
FLUID FILTERING DEVICE
Oscar E. Rosaen, Grosse Pointe Farms, Mich., assignor to The Rosaen Filter Company, Detroit, Mich., a corporation of Michigan
Filed Sept. 19, 1960, Ser. No. 56,826
1 Claim. (Cl. 210—108)

My invention relates to fluid filters and more particularly to a filter having means for dislodging foreign matter tending to clog the filter and for separating the foreign matter from the fluid while the filter is being used.

Filter clogging heretofore has been a serious problem, particularly in systems used to supply cooling and lubricating oil, water and the like to machinery wherein relatively large quantities of dirt, metal particles and other foreign matter are accumulated in the fluid and must be eliminated before further use of the fluid is desirable. No matter how large the filter may be, it will sooner or later become clogged and will have to be replaced, usually causing shut-down of machinery.

In some cases, the time, expense and inconvenience of periodic filter changing and/or cleaning outweighs the value of filtering the fluid, and large reservoirs have to then be used in the hope that foreign matter will settle out of its own accord. Obviously, apart from the fact that this requires use of excessive fluid and wasted space, such solutions are unsatisfactory since much foreign matter will sometimes remain insuspension and can only be removed by filtration.

One solution that has proved quite satisfactory is described in my copending application for patent, Ser. No. 24,330, filed April 25, 1960, and now Patent No. 3,074,556, in which a reverse fluid flow is provided continuously through a constantly changing portion of the filter, the foreign matter dislodged thereby being carried off separately.

However, the device as there described requires separate fluid inlets and pumps, uses more fluid in cleaning than is really necessary, and results in a continuous, although slight, lessening of fluid flow and pressure through the filtering mechanism. These slight deficiencies are of course more than compensated for by the fact that only small filters are needed, cleaning is effectively accomplished, and no filter replacement will generally be necessary.

The present invention has for a primary object the elimination of these further problems by providing an improved intermittently operated filter cleaning device.

Another object of the invention is to improve filtering systems by providing means periodically dislodging foreign matter from filters while the filter is in use.

A further object of the invention is to prevent clogging of fluid filters by intermittently ejecting a stream of fluid through the filter in a direction opposite to normal fluid flow.

Yet another object is to eliminate frequent replacement of fluid filters by providing a means, operable automatically on sensing a pressure differential increase across the filter due to clogging to dislodge and remove foreign matter while the filter is yet in use.

A still further object of the invention is to improve over my aforesaid copending patent application by providing a means of dislodging and removing foreign matter from a filter, using the pressures of the normal fluid filtering system both for removing the foreign material and for automatic operation or actuation of the removing system.

For a more complete understanding of the invention, reference may be made to the accompanying drawings illustrating a preferred embodiment of the invention in which like reference characters refer to like parts throughout the several views and in which FIG. 1 is a cross-sectional view of a preferred device embodying the invention, as taken on the line 1—1 of FIG. 2.

FIG. 2 is a longitudinal cross-sectional view taken substantially on the line 2—2 of FIG. 1.

FIG. 3 is a fragmentary elevational view of a cam used in the device.

FIG. 4 is a fragmentary view of the filter inner cylinder.

FIG. 5 is a fragmentary view of the filter outer cylinder, and

FIG. 6 is a schematic of a preferred electrical system used in the invention.

In FIGS. 1 and 2, the preferred device embodying the present invention is shown as comprising a substantially cylindrical filter housing structure 10 having end caps 10A and 10B secured thereto by any means such as screws 11 to enclose a cylindrical filter structure 12 supported at its inner end on an annular boss 13 of the end cap 10A and at its outer end by an annular plate 14 peripherally carried by an annular recess 15 in the housing 10 and held against an O-ring seal 16.

The plate 14 is provided with openings 17 providing communication between a fluid inlet port 18 provided in the end cap 10B and the interior of the filter 12, this space being designated as the intake chamber 19 or the inlet pressure side of the filter 12. The filter 12 being radially spaced from the inner surface of the housing 10 provides an annular outlet chamber 20 designated as the outlet pressure side of the filter 12. The housing 10 has an outlet port 21 communicating with the outlet chamber 20. A delivery pipe 22 is mounted on the housing 10 by means of a cap 23 secured by any means such as screws 24.

Fluid under pressure enters the inlet port 18 and passes through the filter 12 from the inlet to the outlet pressure side and is delivered through pipe 22 which is connected to any preferred fluid uses.

In order to maintain at least a slight degree of fluid pressure on the outlet pressure side of the filter 12 at all times during use, where the fluid user itself does not create back pressure, a butterfly valve 25, secured to a rotatable shaft 26 by any means such as a cotter pin 27, is disposed in the pipe 22 as shown. The shaft 26 has an arm 28 and is urged toward the closed position by any means such as a weak spring 29 connecting a pin 30 on the arm 28 with a pin 31 on the cap 23. A slight pressure is required to open the valve 25, but fluid flow itself is not materially restricted as the valve 25 may be opened completely to the dotted line position of FIG. 2.

A collector device 35 is disposed inside the filter 12, i.e., on the inlet pressure side. This device comprises a hollow shaft 36 rotatably supported near one end by the end cap 10A in a bearing 37 or the like. The other end has a plug 38 provided with an axial stub shaft 39 supported by the plate 14 in a bushing 40 or the like.

A plurality of longitudinally spaced tubes 41 are carried on the shaft 36 and communicate with the interior thereof. The tubes 41 carry a collector manifold element 42 which has an outwardly opening inlet channel 43 disposed closely adjacent the filter 12, which comprises an inner perforated cylinder 12A, shown in FIG. 4, supporting an outer cylinder 12B, shown in FIG. 5, of screen, paper, cloth or any preferred filtering material.

The tube 36 extends through the end cap 10A and carries a housing 45 provided with a cam 90 and a valve chamber 46. A valve seat member 47 is disposed in the housing 45 and has spill ports 48.

A stationary casing 49 encloses the housing 45 as shown in FIG. 2 and has an annular spill chamber 50 openly connected with the spill ports 48. A spill pipe 51 is mounted on the casing 49 for returning spill fluid to a reservoir, settling basin, drain or the like (not shown).

A pulley 55 is secured to the housing 45 by any means such as a screw 56. An electric motor 57 is provided with a driving pulley 58 drivingly connected to the pulley 55 by a belt 59 or the like.

When the motor is operated, it rotates the entire collector device 35, including the tube 36, manifold 42, housing 45, and cam 46.

A valve 60, having a valve stem 61, carried by the seat member 47, is urged to a closed position by any means such as a spring 62, and is selectively opened by means of a solenoid actuator 63 preferably mounted on a bracket 64 secured to an upwardly extending portion of the end cap 10A.

It will be seen that when the valve 60 is opened, the outlet pressure in the chamber 20 will eject fluid through the filter 12 into the manifold 42, dislodging foreign matter on the inner surface of that portion of the filter 12 adjacent the collector manifold 42, since the pressure on the outlet pressure side of the filter is higher than the pressure in the spill pipe 51 now openly connected through chamber 50, ports 48, and chamber 90 with the inside of the shaft 36 which is openly communicated to the channel 43 of the collector manifold 42 by the tubes 41.

The fluid and foreign matter will thus be discharged. The motor 57 is adapted to operate simultaneously with the opening of the valve 60, so that the collector manifold 42 will rotate and thus operate to clean a continuously changing portion of the filter 12, one revolution generally being enough to effectively unclog the whole filter and eliminate substantially all of the foreign material previously trapped by the filter.

The valve 60 and motor 57 thus need not operate continuously, and a control system is provided which activates the motor and filter only when the filter is clogged to a predetermined degree. The control system is preferably as follows:

A control chamber 70 is provided in the housing 10 and communicates with the inlet pressure chamber 19 by means of a passage. The outer end of the chamber 70 is closed by the end cap 10B and the inner end is closed by a plate 71 secured to the housing 10 by screws 72 or the like. A bellows 73 is carried on the plate 71 which has a passage 74 communicating the inside of the bellows 73 with the outlet pressure chamber 20. The bellows 73 is thus responsive to a differential of pressure between the chambers 19 and 20, i.e., it is sensitive to pressure drop across the filter 12. As the filter 12 becomes clogged, the bellows 73 tends to collapse moving a pin 75 to actuate a control rod 76 to the right as seen in FIG. 2. The rod 76 is carried in a tube 77 mounted on the end cap 10A and is urged to the left by any means such as a spring 78 abutting a sleeve 79 adjustably carried on the tube 77 and secured by a set screw 80 or the like. Axial adjustment of the sleeve 79 determines the pressure differential required to overcome compression of the spring 78 for actuating the rod 76. The foregoing elements are preferably enclosed by a casing 81 secured to the housing 10 and end cap 10A by screws 82 or the like.

A switch 85 is preferably mounted on the bracket 64 so that its operating button 86 is angularly presented to the preferably beveled end of the control rod 76. When the switch 85 is actuated by the control rod 76, it energizes the motor 57 and the valve operating solenoid 63 through any appropriate circuit such as that illustrated in FIG. 6. Thus the valve is opened and the collector device 35 is rotated simultaneously.

The cam 46 also rotates, and has a beveled cam edge 46A which contacts the switch button 86 to hold it closed as the collector device 35 rotates at least one full revolution. The cam 46 has one flat section 46B as shown in FIG. 3, which, after one revolution, permits the switch 85 to open providing the filter has been cleaned sufficiently to reduce the pressure drop across the filter so that the control rod 76 no longer contacts the switch button 86. If the filter 12 is not clean enough, the collector device 35 will be rotated a further cycle, or as many times as are necessary.

It will be seen from the foregoing that I have provided an effective and simplified means for automatically dislodging and removing foreign matter clogging the filter at any time that a predetermined pressure drop across the filter is sensed.

Although I have described only one preferred embodiment of my invention, it will be apparent to anyone skilled in the art to which the invention pertains that various changes and modifications may be made therein without departing from the spirit of the invention or the scope of the appended claim.

I claim:

In a fluid filtering device,
(a) a housing having a filter chamber,
(b) said housing being provided with an inlet and an outlet open to said chamber,
(c) a filter element disposed in said chamber intermediate said inlet and said outlet,
(d) a pressure responsive device carried in said housing operatively connected across said filter element and operable to respond to increases in the pressure differential across said filter element,
(e) a normally open switch operably connected with said pressure responsive device and operable to close upon the pressure differential across said filter element increasing to a predetermined value and to open again upon the pressure differential decreasing again to a value below said predetermined value,
(f) a motor electrically connected to said switch to be energized when said switch is closed,
(g) a collector element having a fluid conductor, an inlet connected therewith and disposed closely adjacent said filter element on the inlet side thereof, and a drain outlet connected with said conductor,
(h) said motor being operably connected with said collector element to rotate said collector element when said motor is energized to change the portion of said filter element closely adjacent said collector element inlet as said collector element rotates,
(i) a cam engaging said switch when in a closed position and being operable to prevent said switch from opening until said collector element has rotated through at least one complete revolution,
(j) a normally closed valve disposed in said drain outlet and operably connected to said switch to open when said switch closes, and
(k) means disposed in said outlet and operable to maintain a minimum fluid pressure on the outlet side of said filter element, said means comprising,
a valve member pivotally carried in said outlet and being operable to be pivoted toward an open position upon fluid pressure provided at said outlet, and
means urging said valve member toward a closed position.

References Cited in the file of this patent

UNITED STATES PATENTS

| | | |
|---|---|---|
| 1,945,839 | Von Maltitz | Feb. 6, 1934 |
| 2,066,479 | MacIsaac | Jan. 5, 1937 |
| 2,275,958 | Hagel | Mar. 10, 1942 |
| 2,451,073 | Cowherd | Oct. 12, 1948 |
| 2,569,748 | De Grave | Oct. 2, 1951 |
| 3,012,677 | Hungate | Dec. 12, 1961 |